United States Patent [19]
Hegeman et al.

[11] Patent Number: 6,123,826
[45] Date of Patent: Sep. 26, 2000

[54] METHOD FOR REMOVAL OF NICKEL AND IRON FROM ALKALI METAL HYDROXIDE STREAMS WITHOUT REQUIRING THE USE OF SODIUM BOROHYDRIDE

[75] Inventors: John William Hegeman; Todd Richard Pickle; Gary Lee Sulik, all of Henderson, Nev.

[73] Assignee: Pioneer (East) Inc., Wilmington, Del.

[21] Appl. No.: 09/419,686

[22] Filed: Oct. 14, 1999

[51] Int. Cl.$^7$ .................................................. C25B 1/16
[52] U.S. Cl. ...................... 205/516; 205/512; 205/536; 210/695
[58] Field of Search .................... 205/516, 512, 205/536; 210/695

[56] References Cited

U.S. PATENT DOCUMENTS

| | | | |
|---|---|---|---|
| 3,944,479 | 3/1976 | Ruthel et al. | 204/297 R |
| 4,025,405 | 5/1977 | Dotson et al. | 205/512 |
| 4,039,568 | 8/1977 | Sakai et al. | |
| 4,065,376 | 12/1977 | Whyte et al. | 204/263 |
| 4,104,133 | 8/1978 | Brannan et al. | 205/122 |
| 4,252,878 | 2/1981 | Lazarz et al. | 429/250 |
| 4,260,469 | 4/1981 | McIntyre et al. | 204/265 |
| 4,963,235 | 10/1990 | Brattan et al. | 205/536 |
| 5,290,470 | 3/1994 | Dutcher | 510/109 |

OTHER PUBLICATIONS

Eriez Manufacturing Co., Ferrous Traps (SB–420P), 1998, 8 pages; (no month).
OxyTech Systems, Inc. (Tilak Bommaraju & Paul Orosz), Caustic Evaporator Coorosion: Causes and Remedy, Mar. 1992, 15 pages.

*Primary Examiner*—Arun S. Phasge
*Attorney, Agent, or Firm*—Wendy K. Buskop; Buskop Law Group

[57] ABSTRACT

The present invention relates to a method to control of the presence of nickel and/or iron in a caustic solution using at least two magnets to remove about one third of the nickel and/or iron present in a caustic solution. The method involves passing cell liquor through a first magnet at a flow rate of about 600–900 gallons per minutes removing a significant amount of nickel and/or iron from the cell liquor forming first fluid, then evaporating a significant amount of water out of that first fluid and raising the temperature of that first fluid to above 330 F., then cooling the more concentrated caustic solution to a temperature of between about 75 and 100 F. forming a cooled solution, passing the cooled solution through a second magnet and removing additional nickel and/or iron forming a second cooled solution, filtering that second cooled solution forming a filtered solution, passing the filtered solution through an optional third magnet to remove remaining nickel and/or iron forming a substantially metal free caustic solution.

20 Claims, 2 Drawing Sheets

METHOD FOR REMOVAL OF NICKEL AND IRON FROM ALKALI METAL HYDROXIDE STREAMS WITHOUT REQUIRING THE USE OF SODIUM BOROHYDRIDE

BACKGROUND

Alkali metal hydroxides can be prepared using different types of electrolytic cells, including membrane and diaphragm-type cells. The present invention is particularly directed to a method of making caustic using a diaphram electrolytic chlorine cell, and more specifically for a chlor-alkali processes.

After electrolysis, the caustic stream is traditionally treated to become more concentrated. During that process, the caustic often reacts with the reactors which are typically made of nickel causing numerous problems in the process.

A need has long existed in the caustic industry for a technique to remove metal, particularly nickel and iron from a caustic manufacturing process without adding additional chemicals to the process.

A need has existed for an environmentally friendly metal removal process which lowers the cost to manufacture at least two grades of caustic, standard and bleach grade.

Alkali metal hydroxide solutions are typically prepared by the electrolysis of alkali metal salt solutions in electrolytic cells. Diaphragm cells are known for producing alkali metal hydroxide solutions electrolytically. In this type of cell, a porous cathode with an overlying porous diaphragm is used to separate or to serve as a barrier between the catholyte and anolyte compartments of the cell. An objectionable feature of this system is that sodium borohydride has been needed to be added to the solution to reduce the effect of nickel on the further treatment of caustic. The use of the sodium borohydride has caused high expense and increased the presence of nickel oxides in the reactors.

The present invention is directed at a method for reducing the amount of free nickel and nickel oxides, free iron and ferrous oxides in the chlor-alkali systems, particularly for the diaphragm types of cells without the need for additional chemicals, additional sodium borohydride, or other contaminants.

In order to overcome the disadvantages of the prior art the present invention proposes the use of magnets in situ in the caustic manufacturing process to overcome these problems with the nickel and the iron.

SUMMARY OF THE INVENTION

The present invention relates to a method to control of the presence of metals, particularly nickel and iron in a caustic solution using at least two magnets to remove about one third of the nickel and/or iron present in a caustic solution. The method involves passing cell liquor through a first magnet at a flow rate of about 600–900 gallons per minutes removing a significant amount of nickel and/or iron from the cell liquor forming first fluid, then evaporating a significant amount of water out of that first fluid and raising the temperature of that first fluid to above 330 F., after heating the fluid is cooled to a temperature of between about 75 and 100 F. forming a cooled solution, then passing the cooled solution through a second magnet and magnetically removing additional metal, nickel and iron forming a second cooled solution. Filtering that second cooled solution, and passing the filtered solution through an optional third magnet to remove additional nickel and/or iron is contemplated herein.

It is an object of this invention to provide a method which enables caustic to be manufactured in a more environmentally friendly manner.

It is an object of this invention to provide a method by which caustic can be manufactured less expensively than known techniques.

It is an object of this invention to provide a method which removes at least 33% of the nickel in a caustic solution without the use of additional chemicals.

These and other objects and advantages of the invention disclosed herein will become apparent to those skilled in the art from a reading of the following specification and the appended claims and by reference to the attached Figures.

DETAILED DESCRIPTION

Figure 1:
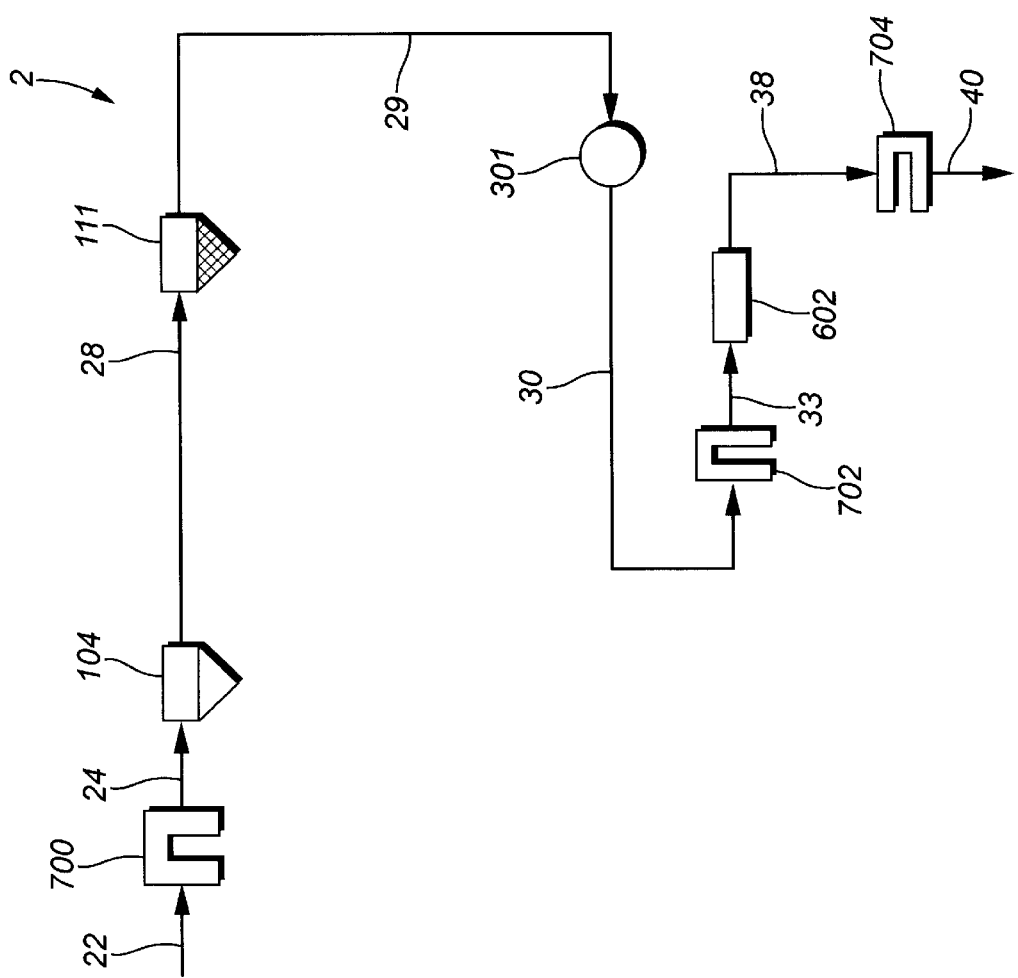
FIG. 1 is a flow chart describing a unique method for removal of metals including nickel and iron from a caustic manufacturing process.
Figure 2:
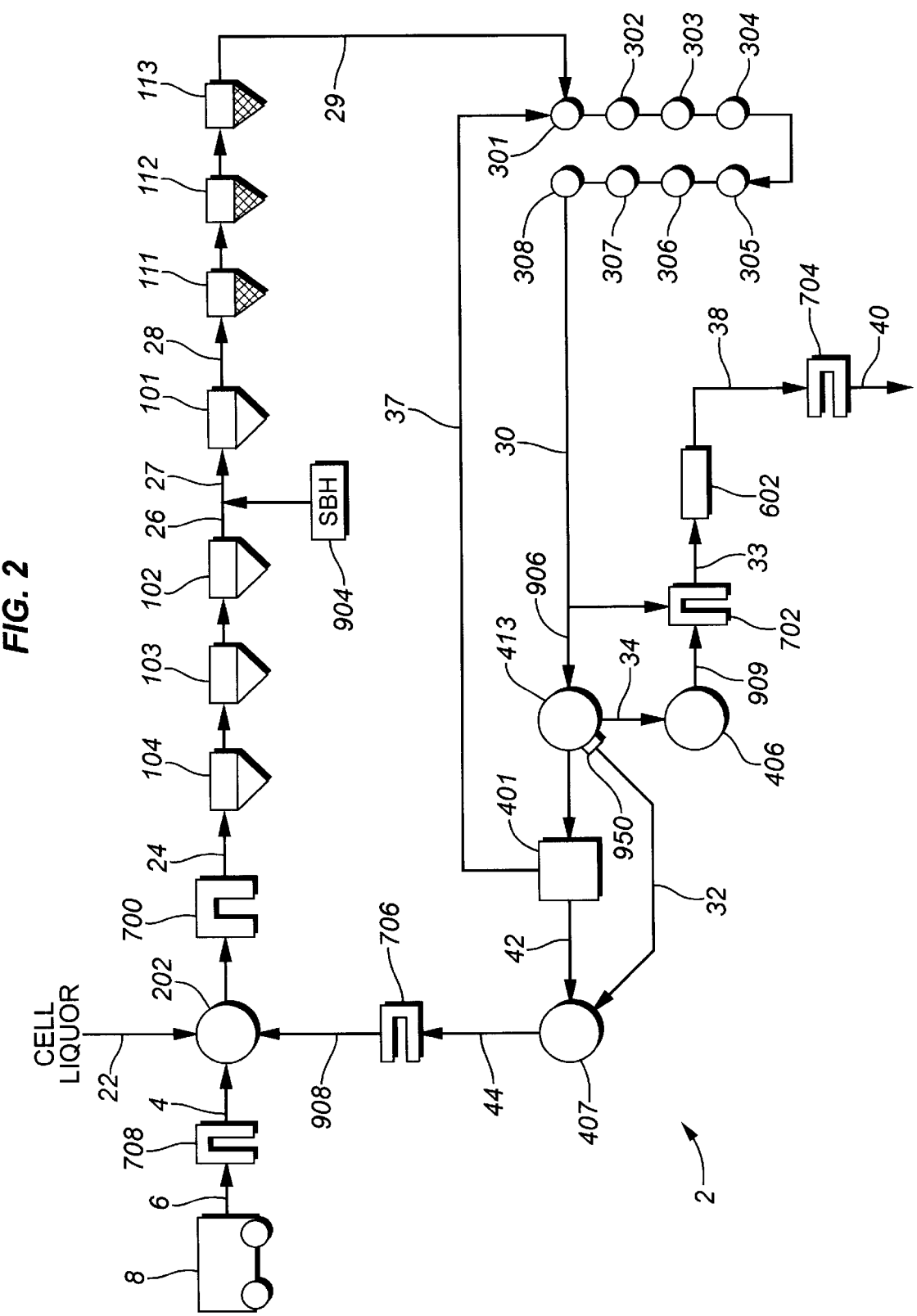
FIG. 2 is a flow chart detailing the caustic manufacturing process using the unique magnets to remove nickel and iron.

Referring to FIGS. 1 and 2, the invention relates to a caustic manufacturing process (2) such as a chlor-alkali process which utilizes magnetism, and most preferably tubular magnets to remove nickel and or iron or both from a caustic stream. The invention relates more particularly to a method for the use of at least two magnetic traps for removing iron or nickel or both from the fluid in a caustic manufacturing process.

The following terms will be used to describe this invention:

"Iron" refers to iron particles, iron compounds and free iron, which are not in solution, including but not limited to iron oxide ($Fe_2Fe_3O_4$), iron hydrides and particulates of iron metal, various of iron oxides and ferrides, and combinations thereof.

"Nickel" refers to nickel particles, nickel compounds and free nickel, which are not in solution, including but not limited to nickel oxide, nickel hydrides, and particulates of nickel metal, and combinations thereof.

"Caustic manufacturing process" refers to a manufacturing process wherein alkali metal hydroxides are treated to produce a more concentrated by weight percent solution. Included in this definition, but not a limitation of this definition is the caustic manufacturing process wherein rock salt is processed into a brine, or brine is the initial material, and the salt solution is passed into an electrolytic cell of the diaphragm type or membrane type, and then with the application of electricity, the cell separates the components into hydrogen, chlorine and caustic. The caustic is then further treated with various evaporation, cooling and filtration techniques to produce a more concentrated alkali metal hydroxide solution. It is considered within the scope of this definition to include all caustic solution, which include solutions of sodium, lithium, cesium, potassium and rubidium.

"Chlor-alkali" when referred to herein, is the generic industry term used to define the process of making simultaneously chlorine and caustic from a sodium chloride solution.

The present invention can be used for any caustic manufacturing process, but the most preferred embodiment is for use in an alkali metal hydroxide aqueous solution manufacturing process, which utilizes a diaphragm electrolytic cell for the separation of chlorine, caustic and hydrogen.

Details of the general electrolytic process can be see in U.S. Pat. No. 4,025,405 which is incorporated by reference herein.

In particular, the present invention can be used to treat caustic in a manufacturing processes which produce a bleach grade caustic with 0.5 PPM or less nickel present in the resultant product. However, the present invention shall also apply to standard grade caustic refers to caustic which has a nickel content of between about 3.0 and 0.51 PPM nickel and preferably about 1.0 PPM nickel.

The most preferred embodiment of this invention utilizes the MDC-29 electrolytic system available from Eltech Systems Corporation of Chardon, Ohio.

The present invention involves a process for the production of alkali metal hydroxide with substantially reduced metal content which involves several steps:

a. providing an aqueous alkali metal salt solution to the anode compartment of an electrolytic cell in which a dimensionally stable anode and a cathode are maintained in separate anode and cathode compartments by an electrically conductive diaphragm interposed between said anode and said cathode;

b. electrolyzing the aqueous alkali metal salt solution forming hydrogen, chlorine and a caustic solution while maintaining said solution at a temperature of from about 75° to about 100° C. and said aqueous alkali metal salt solution has a pH of between about 2–6; and c. magnetically removing up to 33% of metals from the solution using at least two magnets by flowing the solution through the magnets during the production process.

It is intended that at least two magnets are used in sequence during the production process, which is preferably continuous, but can be a batch process. The magnets are placed at critical points during the production process. The first critical point is at the point prior to treatment by the first evaporator, which is typically constructed of nickel or plated with nickel, and then the second critical point is after the cooling step and just prior to filtration.

Additional magnets are contemplated as usable in the present process, and it is considered important that these additional magnets be in situ and placed at points after filtration and just prior to the point where the recycle stream enters the system.

This unique process has been analyzed and it has been determined that at least 10% by weight of metal and easily between 20 and 30% by weight of metal is removed from the manufacturing process using each of the magnets. The metals removed are the magnetic metals, particularly those of nickel and iron.

The following is a more detailed attempt to explain the preferred manufacturing process which is the subject of the present invention with particular reference on FIG. 2.

The caustic stream, preferably a sodium caustic stream, initially starts out as a cell liquor (22) having between 10 and 13 wt % caustic, most preferably 12 wt % caustic. Additionally, cell liquor (22) contains appoximately 15% sodium chloride. Sodium sulfates may be present in the cell liquor (22) as well. The balance of the cell liquor (22) is typically water. In addition, cell liquor (22) contains various metals, including but not limited to iron and nickel in the parts per million ranges (PPM).

Cell liquor (22) is pumped from feed tank (202) to flow through a first magnet (700) at a flow rate of typically between 600 to 900 gallons per minute, and a preferred flow rate of about 750–800 gals per minute. The temperature of the cell liquor (22) is typically between 170–205 F. In the preferred embodiment, the temperature of the cell liquor (22) is maintained between 190–205 F.

Cell liquor (22) is passed through a first magnet (700) which can be one built by Eriez Manufacturing Company, as described in U.S. Pat. No. 5,236,091 which is hereby incorporated by reference.

This first magnet (700) magnetically removes up to one-third of the metals and their related hydrides and oxides, typically nickel, iron or combinations thereof.

In the preferred embodiment, magnet (700) is a rare earth magnet, called a "permanent magnetic ferrous trap", model T10 Re3HP Trap, style 9900032, built by Eriez Manufacturing Company, located in Erie, Pa. It is contemplated that other magnets can be used, such as those manufactured by Industrial Magnetics of Boyne City, Mich. Rare earth magnets which are capable of trapping both iron and nickel are considered the most usable magnets in the present invention. Magnet (700) can be a tubular magnet, placed in situ in cell liquor (22). Other magnet geometrics and shapes are possible within the scope of the present invention. Simply, the aqueous solution of the manufacturing process needs to flow through or around the magnet (700). It is considered to be within the scope of this invention to use other magents, as is feasible given the manufacturing parameters, such as electromagnets, ceramic magnets or other similar magnets.

Magent (700) is preferably a tubular rare earth magnet placed in situ in cell liquor (22). The size of the magnet can be varied depending on the flow rate of the cell liquor (22) and the size of the piping and tanks used to produce the caustic. The tubular magnet could have up to or over 100 tubes, depending on the size of the facility, composition of the stream, and viscosity of the cell liquor (22).

In the most preferred embodiment, it is contemplated that the magnet (700) has from 1 to 17 tubular members, and most preferably 11 tubular members. The most preferred embodiment contemplates a manufacturing flow rate of between 650 to 800 gallons per minute flowing from a vessel size of 16 ft in diameter and is 15 feet in height.

Testing using the chlor-alkali manufacturing process reveals that this first magnet (700) can remove up to about 33% of the metal present in the stream, particularly the nickel and/or iron, by removing such a large percentage of metal from the stream, then the remaining metals in the stream, particularly the metals of nickel and iron do not plate or clad onto the manufacturing equipment and stay in situ.

As an example, when nickel was present in the chlor-alkali caustic manufacturing system, and the manufacturing system ran at about 750–800 gals per minute, the particular amount of nickel removed is enough so that less than 0.1 ppm nickel can be detected in the stream. The process was tested to reveal it could handle nickel removal of between 0.5PPM to 1.0PPM nickel reduction in the stream flowing at 650–800 gals per minute. In those same streams, a similar amount of iron was removed by the first magnet (700) leaving small detection limits.

The resultant stream, containing less metal, was then treated. This resultant stream, termed, the first fluid (24), was then passed to at least one evaporator (104). The first fluid (24) is preferably passed through several evaporators to remove water from the fluid. In some cases, the first fluid (24) is passed through a quadruple effect evaporation system which utilizes a first evaporator (104), a second evaporator (103) and a third evaporator (102) forming concentrated caustic solution (26). After evaporator (102,) still another evaporator (101) is used to further concentrate the fluid and to heat it to over 330 F. forming more concentrated caustic solution (27).

First evaporator 104 is preferably a Swensen evaporator which is capable of evaporating a portion of the water and thereby reducing the temperature of first fluid (24) to operate between about 120 to 135 F., and most preferably 130 F. In the most preferred embodiment, the evaporator is constructed to handle the incoming stream, and is of a size typical for evaporators, with an 18 foot 6 inch diameter and a 15 foot straight side. Preferably, this evaporator is of stainless steel construction.

Second evaporator 103 is preferably a Swensen evaporator which is capable of evaporating an additional portion of water in first fluid (24). In the preferred embodiment, the size of the evaporator has a diameter of 15 feet and a straight side of 15 feet 10 inches. In the most preferred embodiment, ¾ inch stainless steel is used to construct this evaporator. Swensen evaporators are available from Swensen located in Harvey, Ill.

In the preferred embodiment, the operating temperature of evaporator 103 runs in the range of 170 to 185 F., and most preferably at 180 F.

Third evaporator 102 is preferably a Swensen evaporator which is capable of evaporating more water from the first fluid (24). This evaporator preferable has a diameter of 14 feet 0 inch diameter and a straight side of 15 feet 10 inches. In the most preferred embodiment, this evaporator is made from nickel, such as Nickel 200 and operates at a temperature range between 220–230 F. and most preferably about 225 F.

More concentrated caustic solution (27) is fed to yet a fourth evaporator (101) which is preferably a Swensen evaporator capable of evaporating more water from the more concentrated caustic solution (27). This evaporator preferably has a diameter of 13 feet 0 inches and a straight side of 17 feet, 10 inches. In the most preferred embodiment, this evaporator is made from nickel, such as Nickel 200 and operates at a temperature range between 325 to 335 F. and most preferably at about 330 F. The resulting solution is a highly concentrated caustic solution (28). Highly concentrated caustic solution (28) has a caustic concentration range of between 44 to 47% caustic.

Highly concentrated caustic solution (28) is then passed through one or more flash pans to modify the caustic concentration to 49 to 51% caustic by flashing and thereby cooling the solution. The flash pans serve to further concentrate and then cool the highly concentrated caustic solution (28) from a temperature of between 325 to 335 F. to about between about 180–200 F.

It is within the scope of the present invention to only use one flash pan or one evaporator with the manufacturing process. However, in the preferred embodiment, four evaporators and three flash pans are used. Usable flash pans within the scope of the invention are available from the Swensen Company of Ill.

In FIG. 1, the flash pans are indicated as (111), (112), and (113).

Fluid from flash pans (111), (112) and (113) is referred to as second fluid (29). Second fluid (29) is then passed through at least one cooler to reduce the temperature of the second fluid (29).

In the preferred embodiment, eight coolers are used (301), (302), (303), (304), (305), (306), (307), and (308). The coolers (301) through (308) cool the second fluid (29) to between 75 and 100 F. Coolers usable in the scope of the present invention are agitated tanks with coils cooled by cooling tower water which reduces the temperature by 8 to 18 degrees Fahrenheit per cooler. The resulting solution is cooled solution (30).

Cooled solution (30) and be divided and formed into two streams a first cooled solution stream (906) and cooled solution (30). Cooled solution (30) is passed to a second magnet (702) which extracts an additional percentage of nickel and/or iron forming a second cooled stream (33).

It is contemplated that the second magnet (702) is smaller than the first magnet (700). In the preferred embodiment, a magnet of between 5 and 17 tubular members can be used, most preferably 7 tubular members. The 7 tubular member magnet should be capable of enduring between 50 and 150 gallons per minute flow rate and most preferably, a flow rate of between 100 and 110 gallons per minute. In the most preferred embodiment, the flow rate is 100 gallons per minute.

Flow rates through or around the magnets change depending on the viscosity, density and other physical properties of the solution going through the magnet. Accordingly, different flow rates can be used within the scope of the present invention based on normal engineering principles.

As an option, it is contemplated that within the scope of the present invention magnets need to be cleaned and inspected, depending on how much metal is in the system. Interior tubular members of the magnets need to be removed from housing located in the fluid stream of the manufacturing process. Once a shift. Other types of magnets can be used, and it is considered within the scope of the present invention that the particles could be removed by any known process applicable to rare earth metal magnets. The loaded tubes will have metal up to $\frac{1}{8}^{th}$ inch thickness. Frequency of cleaning is determined by the amount of material which needs to be removed from the stream.

After passing through second magnet (702), the resulting solution is a second cooled solution (33) and this solution is then passed to a filter (602). Filter (602) is a pressure leaf filter such as those made by Durco, Optionally, two filters (602) and an identical filter (not shown) can be used in this caustic manufacturing process (2). The first filter (602) is used until salt fills the filter openings then it is taken off line and flushed with additional cell liquor (900) while the second filter operates.

In the preferred embodiment a Durco 60 HC 1040 filter is used. Filter (602) and optional filter (not shown) preferably have filter areas of 1040 sq. feet and 36 leaves. Other filters are considered usable within the scope of this invention and this filter is not considered the only one usable herein.

Filter (602) forms two streams, a salt stream (35) which is then passed to a salt stream collection tank (407), and a filtered solution (38) which is passed to a third magnet (704) which forms a 40–55 wt percent, preferably 49–51 wt % caustic solution with low nickel content (40), less than 0.1 ppm Nickel.

Magnet (704) is preferably a rare earth magnet called a model HTT03R (3 inch body size) magnet build by Industrial Magnets located in Boyne City, Mich.

Liquid from salt stream collection tank (407) (hereafter termed the final stream (44)) can then be optionally passed through an additional magnet (706) and additional nickel or iron or both can be magnetically removed from the final stream (44). Magnet (706) is also a rare earth magnet having between 1 and 17 tubular members, most preferably 7 tubular member, and a four inch housing in the most preferred embodiment.

Final stream (44) passing out of magnet (706) flows to feed tank (202) for recycling through this caustic manufacturing process via feed line (908). Optionally, but not required in the present invention is the step of passing first cooled solution (906) through a clarifier (413) for separating solids and salts and forming three streams, a salt stream (36), a separated stream (34) which is then directed to a feed tank (406), and a scum box stream (32). Feed tank (406) is connected to magnet (702) via feed tank line (909).

Clarifier (413) is a tank with a rake to separate the first cooled solution (906) into various solutions. The Claifier (413) uses an EIMCO 25 foot, 8 inch diameter rake with a 4 by 7 and ½ inch straight depth.

As a result of passing through clarifier (413), salt stream (36) is a thickened salt slurry stream which flows to solid bowl (401). The solid bowl (401) acts as a centrifuge to separate out the salts from the liquid. The separated stream (34) is between 40 and 55 wt % caustic, more preferably between 49 and 51% caustic, and most preferably 49.5 wt % caustic which flows to tank (406). The scum box stream (32) is a salt slurry stream which flows into salt stream collection tank (407). In the preferred embodiment, scum box stream (32) is passed through a scum box (950) to collect the foam from the top of the scum box (950) and then passed to salt stream collection tank (407).

Solid bowl (401) acts as a centrifuge to separate out liquid (37) (containing 50% caustic) from heavy salt forming a heavy salt stream (42). The separated caustic liquid (37) can then be recycled back to a cooler, such as cooler (301). The resulting heavy salt stream (42) is sent to a tank (403) which receives additional cell liquor (900) for flushing purposes. The combination stream (907) of cell liquor (900) and heavy salt stream (42) is then passed to the salt stream collection tank. (407). Three streams, (902), (32) and (35) are combined in salt stream collection tank (407).

It is contemplated to be within the scope of the invention that this magnetic process for the removal of nickel and/or iron from a caustic manufacturing process can be performed as a batch removal process, or in situ as part of a continuous flow manufacturing process.

EXAMPLE

An MDC-29 electrolytic cell manufactured by Diamond Shamrock, operating at 40–80 KA amperage, having an anode surface area of 29 square meters, utilizes a 4 magnet treatment process can be used with the inventive magnetic removal process. In this example, the first magnet is an eleven member tubular magnet, the second, third and fourth magnets are 7 tubular member magnets. The cell liquor (22) used at the start of the process is 13% caustic. The cell liquor (22) is flowed through the first magnet (700) at a rate of about 650–750 gallons per minutes. The cell liquor is heated to over 330 F., then cooled. The cell liquor is passed through another magnet at about 100 gallons per minute, and as a result of the two step process 30% of the nickel is removed from the process. As an added benefit, at least 30% of the iron is removed from the caustic manufacturing process.

The following is a table showing the amount of nickel in the caustic manufacturing process prior to exposure with the magnets and the amount of nickel in the resultant product after exposure to the magnetic process. The clear environmental advantage of this process can be seen in this table. The following data is from January 1999 tests of the process. Detection limit is 0.1 ppm

| Cell Liquor | Stream 28 | Final Product 40 |
|---|---|---|
| | Before Magnet January 1999 | |
| 0.5 ppm Ni | 1.0 ppm Ni | 2.5 ppm Ni |
| 0.82 ppm NI | 2.97 ppm Ni | 1.62 ppm Ni |
| 0.23 ppm Ni | 1.5 ppm Ni | 1.8 ppm Ni |
| 0.55 ppm Ni | 3.5 ppm Ni | 3.5 ppm Ni |
| 0.33 ppm Ni | 1.8 ppm Ni | 3.0 ppm Ni |
| | After Magnets are inserted in the process May–June 1999 | |
| Ni not detected Not detected to 0.2 ppm | Ni not detected Not detected to 0.5 ppm | Ni not detected Not detected to 0.5 ppm |

With the above description, the present invention consists of the combination and arrangement of parts, and steps described herein and illustrated in the accompanying figures, however, it is understood that changes may be made in the order of the steps, size of the units, and minor details without departing from the sprit of the present invention.

What is claimed is:

1. A method for the control of the presence of metal in a caustic manufacturing process comprising the steps of:
   continuously providing a cell liquor containing metal to a first magnet;
   magnetically removing up to about one third of said metal present in the cell liquor forming a first fluid;
   evaporating a significant amount of water out of said first fluid using at least one evaporator and at least one flash pan and raising the temperature of the first fluid to above 330° F. forming a second fluid;
   cooling said second fluid using at least one cooler forming a cooled solution;
   continuously providing the cooled solution to a second magnet;
   magnetically removing an additional amount of said nickel from said cell liquor forming a second cooled stream;
   filtering said second cooled stream using at least one filter and forming a filtered solution;
   continuously providing the filtered solution to a third magnet and;
   magnetically removing any additional nickel from said filtered solution forming a substantially pure caustic solution.

2. The method of claim 1 wherein said step of magnetic removal by said first magnet removes from about 0.5 to about 1.2 PPM of said nickel from said cell liquor using a flow rate of between 600 and 900 gallons per minute.

3. The method of claim 2 wherein said step of magnetic removal by said first magnet removes from about 0.5 to about 1.0 PPM of said nickel from said cell liquor.

4. The method of claim 1, comprising the additional steps of:
   passing the cooled solution to a clarifier which forms three streams, a scum box stream, a separated stream and a salt stream;
   flowing salt stream to solid bowl forming a solids stream;
   flowing the separated stream to said second magnet and magnetically removing any remaining nickel forming second cooled solution.

5. The method of claim 4, wherein said solids stream is flowed to tank which flows to combination stream which flows to salt stream collection tank, which flows to final stream which flows to magnet which magnetically removes additional metal from the solids stream and then is passed to first magnet.

6. The method of claim 1, wherein the first magnet has between 5 and 17 tubular members.

7. The method of claim 1, wherein the second magnet has between 4 and 7 tubular members.

8. The method of claim 1, wherein the third magnet is approximately the same number of tubular members as the second magnet.

9. The method of claim 1, wherein said cooling step uses between 1 and 4 evaporators.

10. The method of claim 1, wherein said evaporative step uses between 1 and 4 evaporators and between 1 and 3 flash pans.

11. The method of claim 1, wherein said cooling step uses between 1 and 8 coolers.

12. The method of claim 1, wherein said filtering step further comprises dividing said cooled stream and forming a filtered solution and a salt stream and wherein said salt stream is additionally flushed with additional cell liquor.

13. The method of claim 1, wherein the first magnet is larger than the secnd and third magnets.

14. The method of claim 1 wherein the metal is a nickel selected from the group comprising nickel oxide, nickel particulate, and free nickel ions.

15. The method of claim 1, wherein the metal is an iron selected from the group iron oxide, particulate iron and free iron ions.

16. A process for the continuous production of alkali metal hydroxide substantially free from metals, and other impurities which comprises:

a. continuously providing an aqueous brine solution to the anode compartment of an electrolytic cell in which a dimensionally stable anode and a cathode are maintained in separate anode and cathode compartments, respectively, by an electrically conductive diaphragm interposed between said anode and said cathode;

b. electrolyzing the aqueous brine solution forming hydrogen, chlorine and caustic while maintaining said solution at a temperature of from about 75 to about 110 F.;

c. continuously and magnetically removing metals and other impurities from the solution using at least one magnet by flowing the solution through the magnet during the continuous production process.

17. The process of claim 16, wherein two magnets are used in sequence during the continuous production process.

18. The process of claim 16, wherein between 20 and 30% by weight of said metal is removed.

19. The process of claim 16, wherein the metals and other impurities are selected from the group, nickel, iron, particulate nickel, particulate iron, ferrous oxide, nickel oxide and related nickel and iron compounds.

20. The process of claim 16, wherein said at least one magnet is a rare earth magnet.

* * * * *